(12) United States Patent
Lynch et al.

(10) Patent No.: US 6,275,484 B1
(45) Date of Patent: Aug. 14, 2001

(54) METHODS AND APPARATUS FOR INCREASING THE UPLINK GAIN FOR A CDMA BASE STATION

(75) Inventors: Michael A. Lynch, Landing; Christopher F. Zappala, Whitehouse Station, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/880,813

(22) Filed: Jun. 23, 1997

(51) Int. Cl.[7] ................................................. H04B 7/216
(52) U.S. Cl. ............................................ 370/342; 455/562
(58) Field of Search .................................. 375/299, 347, 375/349, 200, 367; 455/101, 82, 83, 561, 562, 277.1, 277.2, 132; 370/320, 335, 342, 334

(56) References Cited

U.S. PATENT DOCUMENTS

| | | | |
|---|---|---|---|
| 5,289,499 | * 2/1994 | Weerackody | 375/141 |
| 5,481,570 | * 1/1996 | Winters | 375/347 |
| 5,533,011 | 7/1996 | Dean et al. | 370/18 |
| 5,541,963 | * 7/1996 | Nakagoshi | 375/347 |
| 5,563,610 | 10/1996 | Reudink | 342/375 |
| 5,652,765 | * 7/1997 | Adachi et al. | 370/211 |
| 5,737,327 | * 4/1998 | Ling et al. | 370/335 |
| 5,757,318 | * 5/1998 | Reudink | 342/372 |
| 5,781,541 | * 7/1998 | Schneider | 370/335 |
| 5,812,542 | * 9/1998 | Bruckert et al. | 370/335 |
| 5,828,658 | * 10/1998 | Ottersten et al. | 370/310 |
| 5,859,879 | * 1/1999 | Bolgiano et al. | 375/347 |
| 5,918,154 | * 6/1999 | Beasley | 455/11.1 |
| 5,933,446 | * 8/1999 | Bond et al. | 375/347 |
| 5,933,466 | * 8/1999 | Oshima et al. | 375/347 |
| 5,940,452 | * 8/1999 | Rich | 375/347 |

OTHER PUBLICATIONS

Wu,X. and A. M. Haimovich, "Space–Time Processing for Increased Capacity of Wireless CDMA." Electro 96. Professional Program Preceedings, 1996, pp. 131–135.*

* cited by examiner

*Primary Examiner*—Melvin Marcelo
*Assistant Examiner*—Jasper Kwoh
(74) *Attorney, Agent, or Firm*—Priest & Goldstein, PLLC

(57) ABSTRACT

An improved CDMA base station for insuring a constant supply of energy to each of a plurality of rake fingers, thus improving gain. One aspect of the base station includes a plurality of pairs of diversity antennas. The energy from the first antenna of each pair is subjected to a delay while the energy from the second antenna of each pair is not subjected to a delay. The added delay is greater than the chip time of the rake fingers. The signals from each pair of antennas is combined and converted to digital form. The energy from all the antennas is then routed to the rake fingers, with the energy from each antenna being routed to one of the rake fingers. The energy from the rake fingers is then combined into a single data stream. In an alternative approach, the base station includes a plurality of diversity antennas. The energy from each of the diversity antennas is subjected to a different amount of delay. The delay difference must again be greater than the chip time of the rake fingers. The energy from the antennas is combined, converted to digital format, and routed to each of a plurality of rake fingers, with the energy from each antenna being routed to the rake finger. The energy from the rake fingers is then combined into a single output data stream.

14 Claims, 8 Drawing Sheets

US 6,275,484 B1

METHODS AND APPARATUS FOR INCREASING THE UPLINK GAIN FOR A CDMA BASE STATION

FIELD OF THE INVENTION

The present invention relates to improved communication signal transmission. More particularly, it relates to an improved antenna system for increasing the gain of an uplink station in a CDMA communication system.

BACKGROUND OF THE INVENTION

The advent of wireless telephony, also referred to as cellular telephony, has given rise to a phenomenal development of new methods and technologies, many directed toward improving the quality of communication and toward accommodating more channels in the same communication spectrum. One approach is Code Division Multiple Access, or CDMA. CDMA standards are defined by IS-95.

In a CDMA system, multiple access is based on spread spectrum technology. A unique binary spreading sequence, a code, is assigned for each call to each user. Multiplied by one assigned code, the user signal is "spread" onto a bandwidth much wider than the original signal. The ratio of the two signals is commonly called the spreading factor. All active users share the same frequency spectrum at the same time. The signal of each user is separated from the others at the receiver by using a correlator keyed with the associated code signal to "despread" the desired signal. Since multiple users share the same frequency spectrum, other users' signals contribute interference. By reducing interference, CDMA system capacity can be increased.

Thus, power control is highly important. Uplink, portable or mobile to base station transmission, power control may ideally seek to control the transmit power from the portable units or mobiles within a cell so that the cell site's receivers receive the same nominal power from all the portables within the cell. If the power can be controlled perfectly, the overall interference can be minimized for the weakest users. As a result, CDMA system capacity in terms of the number of simultaneous users that can be handled in a given system bandwidth can be maximized. Further, by adding additional antenna diversity, power control is improved because fast fading is reduced.

Of course, power cannot be perfectly controlled although a variety of techniques have been employed. It is well recognized, however, that increased system capacity is highly desirable.

In a typical CDMA system, an uplink signal from a mobile unit is captured and processed utilizing a four-finger rake receiver. The rake receiver takes advantage of multipath temporal diversity from multiple antennas. Energy is gathered in the fingers from a maximum of four paths and a single output data stream is generated. Because a form of optimal combining is used to form the output data stream, this arrangement results in a significant uplink gain. The highest uplink gain is achieved when all four rake fingers are actively capturing energy.

A disadvantage of the present state of the art is that not all four rake fingers typically capture energy, but instead one or more of the rake fingers undergo periods of inactivity. Present CDMA base stations typically employ two-branch diversity antennas connected to separate RF inputs. The inputs are down-converted, digitized and assigned to one or more rake fingers. The rake fingers are intended to track two primary and two reflected paths received by two antennas.

However, in practice, it is unlikely for all four fingers to be active at the same time. Typically, only two fingers are active at any given point in time. This typical level of finger activity may be caused, for example, by fading of the primary signal due to short-delay multipath fading, from reflected paths that are too weak to be tracked by the rake receiver, or the like. If all four rake fingers could be constantly supplied with energy from four or more sources, then optimal combining of the finger energy would yield a substantially increased uplink gain, and with independent fading on the branches even further gain would be achieved. With increased gain, lower transmission powers can be employed and increased system capacity achieved. Thus, a system which will help ensure the supply of a constant stream of energy to each of the four rake fingers of a CDMA system is needed and will be highly advantageous.

SUMMARY OF THE INVENTION

Among other things, the present invention addresses the above described needs. To this end, one aspect of the invention provides additional receiving diversity antennas in the base station. In a presently preferred embodiment, the invention is embodied in a tower top package which can be added to a standard CDMA base station. In this approach, additional antennas, band pass filters and linear amplifiers may be packaged as an intelligent antenna retrofit. Alternatively, the active electronics may be placed in the base station with cables running up to additional antennas added to or replacing the existing antenna array.

Each additional antenna is equipped with a delay device, which delays the energy from the associated antenna by an amount greater than the chip time of the rake fingers of the station. The energy from the original antennas and the delayed energy from the additional antennas is combined. The combined energy is mixed with a reference signal, demultiplexed, and routed to the rake fingers. The delayed antenna energy appears to the base station as a strong reflected path and is assigned a separate rake finger. This procedure has the effect of multiplexing two antennas in time through a single RF input insuring more effective utilization of the four rake fingers than consistently is achieved in a typical CDMA system. The rake receiver demultiplexes and processes the data streams independently.

Another aspect of the invention provides a plurality of antennas, with the energy from each antenna being subject to a different delay. Each added delay must differ from every other by more than the chip time of the rake fingers. The signals from the antennas are combined, mixed with a reference signal, and then demultiplexed and routed through the rake fingers. This approach has the benefits of reducing the overall hardware employed to implement the inventions and utilizing less cabling to connect the antennas to the base station as discussed in greater detail below.

A more complete understanding of the present invention, as well as further features and advantages of the invention, will be apparent from the following Detailed Description and the accompanying drawings.

DETAILED DESCRIPTION

Figure 1:
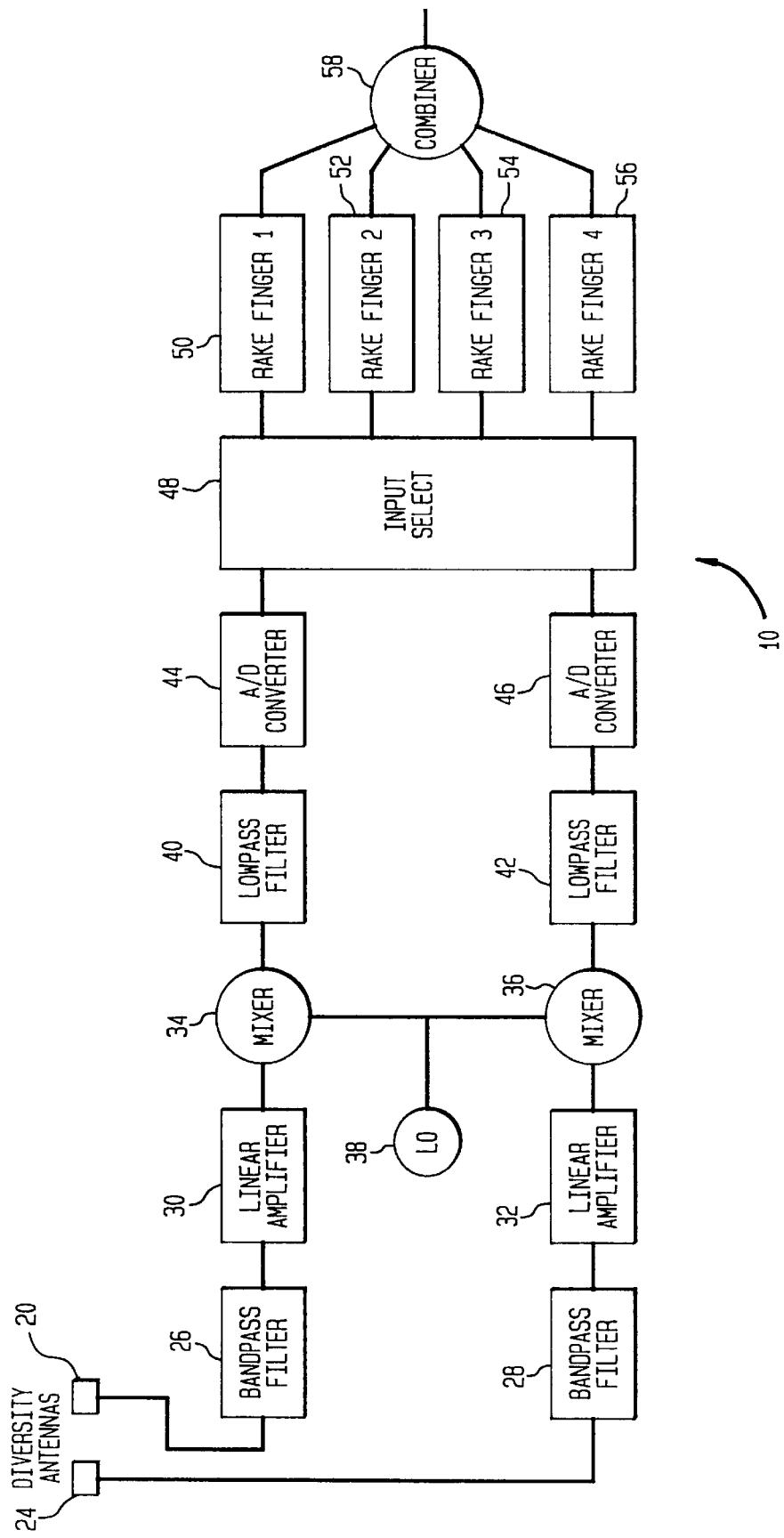
FIG. 1 illustrates a prior art CDMA system.

FIG. 1 illustrates in simplified form a prior art CDMA system 10. The CDMA system 10 includes two diversity antennas 20 and 24 for receiving signals from transmitting mobiles. Each of the antennas 20 and 24 feeds a corresponding bandpass filter 26 and 28, respectively. The bandpass filters 26 and 28 restrict the frequency range of input from the diversity antennas 20 and 24 and pass this input to low noise amplifiers 30 and 32, respectively. The low noise amplifiers 30 and 32 provide an amplified output to mixers 34 and 36, respectively. A local oscillator 38 also provides a known oscillating input to each of the mixers 34 and 36. The mixers 34 and 36 produce as an output a signal consisting of the sums and differences of the low noise amplifiers 30 and 32 and the local oscillator 38, respectively. The outputs of the mixers 34 and 36 are then passed to lowpass filters 40 and 42, respectively. The lowpass filters 40 and 42 remove the sum signals from the outputs received from their respective mixers 34 and 36, leaving the difference signals. The lowpass filters 40 and 42 then pass the difference signals along to analog to digital ("A/D") converters 44 and 46, respectively. The outputs of the A/D converters 44 and 46 are provided to an input selector circuit 48, which selectively connects each of a plurality of rake fingers 50, 52, 54 and 56 to an output of one of the A/D converters 44 and 46. Each of the rake fingers 50, 52, 54 and 56 removes a time delay between the input signals connected to the various rake fingers. Thus, each of the diversity antennas 20 and 24 theoretically provides both direct and reflected signals where the reflected signals are delayed in time from the direct signals. The rake fingers 50–56 remove the delay components of the signals, and the outputs from the rake fingers 50–56 which are then fed into a combiner 58, which produces an output data stream at its output. In theory, all of the rake fingers 50–56 are constantly active, receiving streams of either direct or reflected energy from the antennas 20 and 24. In practice, however, neither the primary nor the reflected signals are always reliably transmitted to all of the rake fingers. Likely causes of this lack of reliability are fading of the primary signal due to short-delay multipath fading or from reflected paths that are too weak to be recognized by the input selector unit 48 and routed to the rake fingers 52 and 56. This typical operation results in a reduction in the actual uplink gain to a value which is well below the theoretically achievable maximum value.

Figure 2:
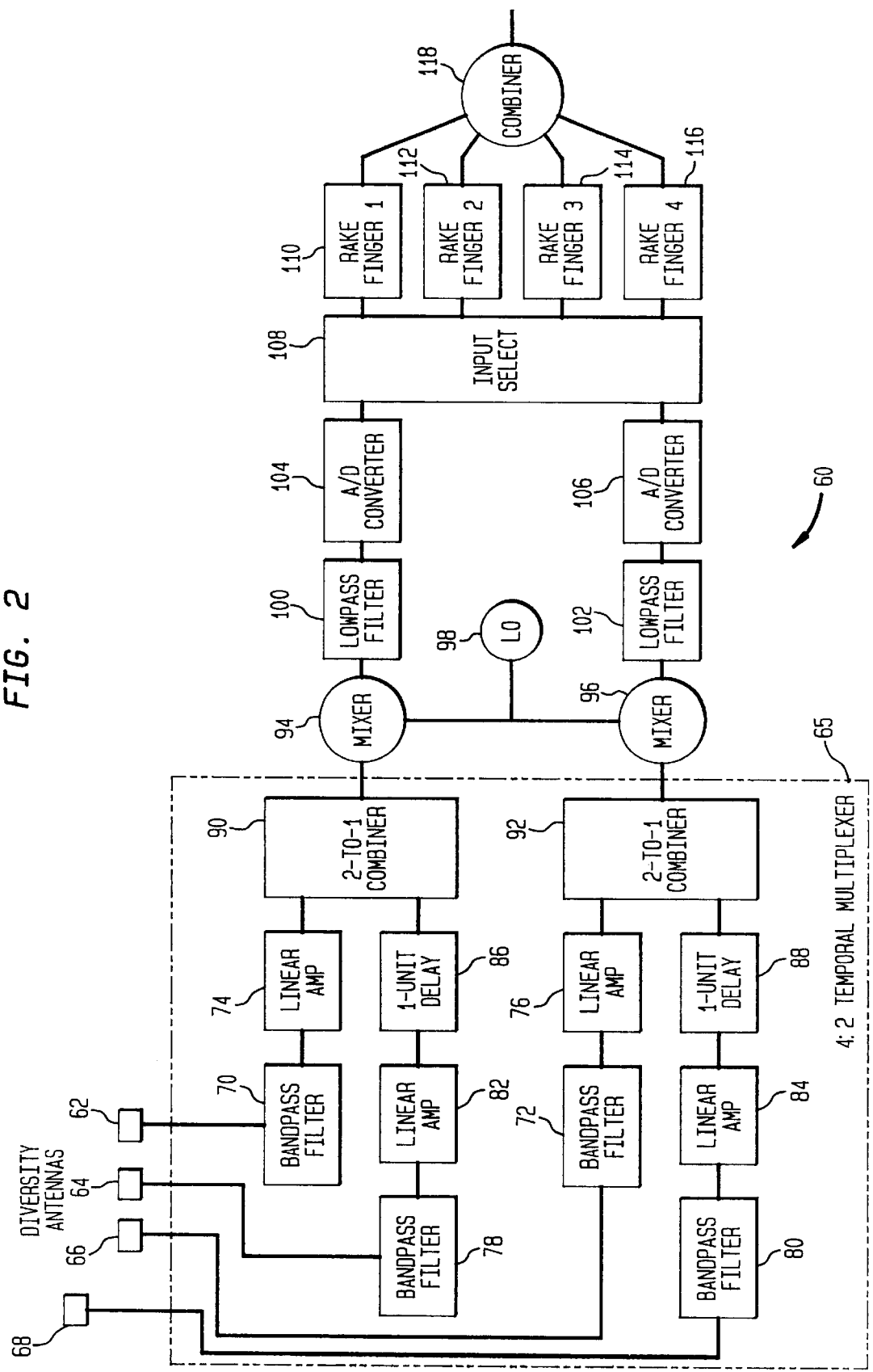
FIG. 2 illustrates a CDMA single unit delay system according to one aspect of the present invention.

FIG. 2 illustrates a single unit delay CDMA base station 60 according to one aspect of the present invention. Station 60 includes four diversity antennas 62, 64, 66 and 68 for receiving signals transmitted by mobiles and a four input to two output ("4:2") 4:2 temporal multiplexer 65. Each of the antennas 62 and 66 provides an input to one of bandpass filters 70 and 72. Each of the bandpass filters 70 and 72 restricts or filters the signal from the antennas 62 and 66, respectively, and provides the restricted or filtered signal as an input to one of low noise amplifiers 74 and 76. Each of the antennas 64 and 68 provides an input to one of bandpass filters 78 and 80. Each of the bandpass filters 78 and 80 restricts the signal from the antennas 64 and 68, respectively, and provides the restricted signal as an input to one of low noise amplifiers 82 and 84. Each of the low noise amplifiers 82 and 84 provides an input to a one-unit delay device 86 or 88. Thus, the signals from the antennas 64 and 68 are subjected to a one-unit delay, while the signals from the antennas 62 and 66 are subject to no delay.

The output of the low noise amplifier 74 and the output of the one-unit delay device 86 are both fed to a first two-to-one combiner 90. The output of the low noise amplifier 76 and the output of the one-unit delay device 88 are both fed to a second two-to-one combiner 92. Each of the first and second two-to-one combiners 90 and 92 operates to sum its inputs together. Thus, the output of the first two-to-one combiner 90 is the sum of the processed outputs of the antennas 64 and 68. The output of the second two-to-one combiner 92 is the sum of the processed outputs of the antennas 2 and 4. Each of the outputs of the first and second two-to-one combiners 90 and 92 is fed to one of the mixers 94 and 96. A local oscillator 98 also provides an input to each of the mixers 94 and 96. The output of each of the first and second combiners 90 and 92 is summed and differenced by each of the mixers 94 and 96 with the output of the local oscillator 98. The output of each of the mixers 94 and 96 is then fed to one of two lowpass filters 100 and 102. Each of the lowpass filters 100 and 102 removes the sum signal and passes the difference signal to provide an input to one of two A/D converters 104 and 106, respectively. The output of each of the A/D converters 104 and 106 is then provided as an input to an input selector circuit 108. The circuit 108 selectively connects each of four rake fingers 110, 112, 114 and 116 to be selectively connected to an output of one of A/D converters 104 and 106. Each of the rake fingers 110, 112, 114 and 116 operates to remove a time delay between the inputs connected to the various rake fingers.

From the above, it will be understood that the diversity antennas 62 and 66 provide immediate signals, while the antennas 64 and 68 provide delayed signals as a result of the one-unit delay devices 86 and 88. Each of the rake fingers 110–116 is therefore much more consistently supplied with a constant stream of energy. The rake fingers 110–116 can then remove the delay components of the signals which are then in turn fed into a combiner 118, which produces an output data stream. In order for the rake fingers 110–116 to be able to demultiplex the delayed and undelayed signals, the amount of delay must be greater than the "chip time" of the rake fingers 110–116. The chip time of a rake finger is the rate at which the rake finger is able to resolve changes in digital code. If the added delay is less than a rake finger's chip time, the rake finger will be unable to distinguish a delayed signal from an undelayed signal. If the delay is greater than the chip time, however, the rake fingers 110–116 are able to distinguish the signals originating with the various antennas, to remove the delays, and to feed the signals to the combiner 118. A CDMA base station having a substantially increased gain is the result.

The single unit delay CDMA station 60 represents a significant improvement over the prior art base station 10 of FIG. 1 as it will typically provide a substantially increased gain due to the provision of an assured supply of energy to each of the rake fingers 110–116. Each of the antennas 64 and 68 provides a robust source of energy which, due to the delay circuitry, appears at mixers 94 and 96 at the same phase with respect to reflected energy received from the antennas 62 and 66. Due to the greater robustness of the energy from the antennas 64 and 68, each antenna's output is properly routed to the appropriate rake finger. This insures that all four fingers will be active substantially all the time under most operating conditions, and thus provides a substantially improved gain.

Figure 3:
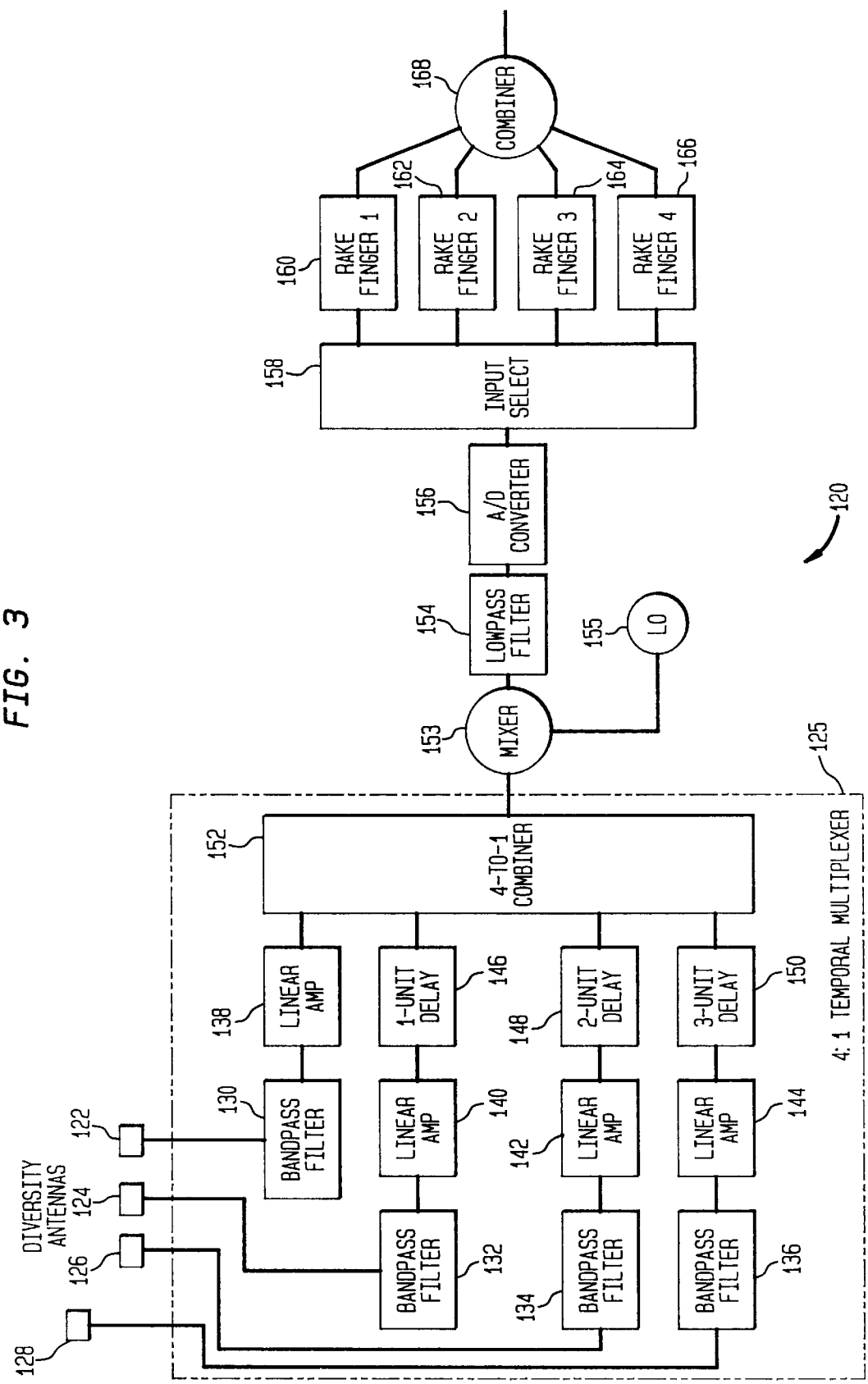
FIG. 3 illustrates a CDMA multiple unit delay system according to another aspect of the present invention.

FIG. 3 illustrates a multiple unit delay system 120 according to another aspect of the present invention. The multiple unit delay system 120 differs from the single unit delay system 60 in that the input from each antenna is delayed by an amount different from that of every other antenna. As shown in FIG. 3, the multiple unit delay system 120 includes four antennas 122, 124, 126 and 128, as well as, a four input to one output ("4:1") temporal multiplexer 125. Each of the antennas 122–128 is connected to one of four bandpass filters 130, 132, 134 and 136 respectively. Each of the bandpass filters 130, 132, 134 and 136 restricts the signal received from its respective antenna 122–128 and passes the restricted signal to one of four low noise amplifiers 138, 140, 142 or 144, respectively. The low noise amplifier 138 is connected directly to a four-to-one combiner 152. The low noise amplifier 140 is connected to a one-unit delay device 146. The low noise amplifier 142 is connected to a two-unit delay device 148, and the low noise amplifier 144 is connected to a three-unit delay device 150. The low noise amplifier 138, and the delay units 140, 142 and 144, are connected to provide inputs to the four-to-one combiner 152.

Thus, the four-to-one combiner 152 receives filtered signals from the antennas 122–128 delayed by zero, one, two and three units, respectively. The four-to-one combiner 152 sums the four radio frequency ("RF") signals it receives and furnishes this sum signal to a mixer 153. The mixer 153 is also connected to receive an input from a local oscillator 155, which supplies a constant reference signal to the mixer 153. Mixer 153 produces an output signal consisting of a signal containing the sum and the difference of the output of the four-to-one combiner 152 combined with the signal from the local oscillator 155. The mixer 153 provides its output signal as an input to a lowpass filter 154, which removes the sum portion of the signal and passes the difference signal. The lowpass filter 154 passes the difference signal to an A/D converter 156. The A/D converter 156 supplies its output to an input selector unit 158. The input selector unit 158 receives a composite digital signal, analyzes that signal, and routes the signal components individually to each one of four rake fingers 160, 162, 164 and 166. Each of the rake fingers 160–166 removes the delay from its received signal. The signal from each of the rake fingers 160–166 is then fed to a combiner 168, which combines the signals into a single output data stream. As was the case for the single unit delay system of FIG. 2, the delays added to each of the antennas 122–128 must differ by an amount greater than the rake finger chip time in order for the rake fingers to properly multiplex and demultiplex the signals.

The multiple unit delay system of FIG. 3 is able to receive and combine four signals, subject to different time delays, and pass the signals through four different rake fingers, keeping each rake finger active substantially all the time under most operating conditions. A strong signal gain is thereby achieved. The multiple unit delay system of FIG. 3 also reduces hardware and cabling or wiring requirements from those illustrated in FIG. 2. The hardware feeding into the four--to-one combiner is only increased by one additional delay unit over that employed by the single unit delay station of FIG. 2, while the station 120 of FIG. 3 eliminates the second mixer 96, low pass filter 102 and A/D converter 106 of FIG. 2. Also, if the components to the left of the mixer 153 are packaged in a single intelligent antenna unit, only a single cable will be required to connect from that unit to the base station.

Figure 4:
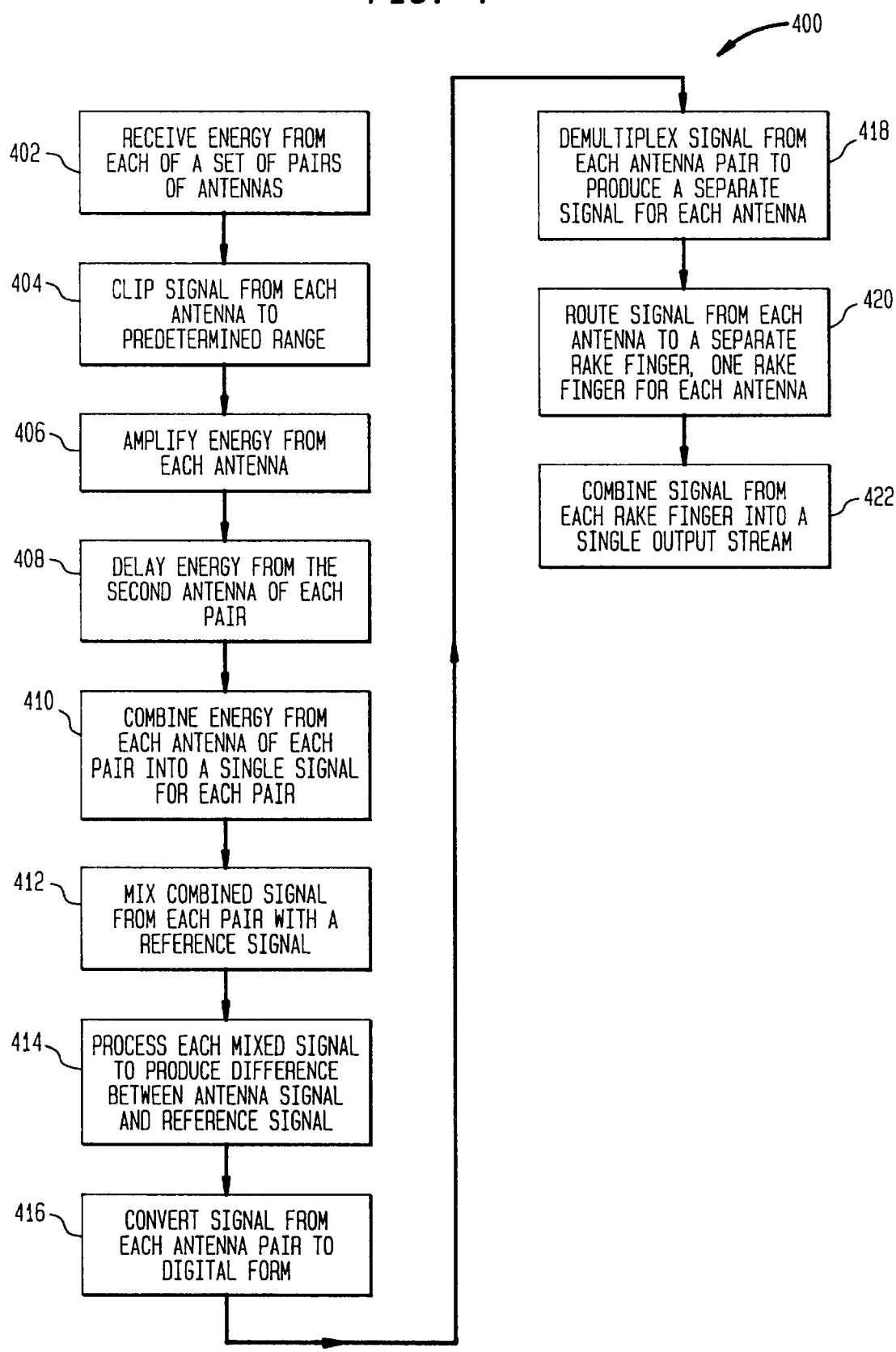
FIG. 4 illustrates a first method for increasing the gain of a CDMA antenna system in accordance with the present invention.

FIG. 4 illustrates the steps preferably performed by a method 400 for improving the gain of a base station by delaying the signal from one of each of a set of pairs of antennas, according to the present invention. At step 402, energy is received from each of a set of pairs of antennas, such as the antennas 62 and 64 or 66 and 68 of FIG. 2. At step 404, the signal from each antenna is restricted to a predetermined range, preferably by passing the signal through a bandpass filter, for example, either of the bandpass filters 70 or 78. At step 406, the energy from each antenna is amplified, preferably by a low noise amplifier, such as either of the low noise amplifiers 74 or 82. At step 408, the energy from the second antenna of each pair is delayed, for example, by the one-unit delay 86. The amount of the delay must be greater than the chip time of the rake fingers of the uplink station. At step 410, the energy from each antenna of each pair is combined, utilizing for example one of the two-to-one combiners 90 or 92, yielding a single signal for each pair. At step 412, the combined signal from each antenna pair is mixed by a mixer, such as one of the mixers 94 or 96, with a reference signal, such as the signal from the local oscillator 98.

At step 414, each mixed signal is processed to yield a signal representing the difference between the combined antenna signal and the reference signal, preferably by passing the mixed signal through a lowpass filter, such as one of the low pass filters 100 or 102. At step 416, the signal from each antenna pair is converted to digital form, for example, by an analog to digital converter such as one of the analog to digital converters 104 or 106. At step 418, the signal from each antenna pair is demultiplexed, for example, by the input selector circuit 108, to yield two signals, one signal derived from each antenna of the pair. At step 420, the signal from each antenna is routed to a separate rake finger, such as one of the rake fingers 110–116. At step 422, the signal from the rake fingers is combined by a combiner such as the combiner 118 to yield a single output stream.

Figure 5:
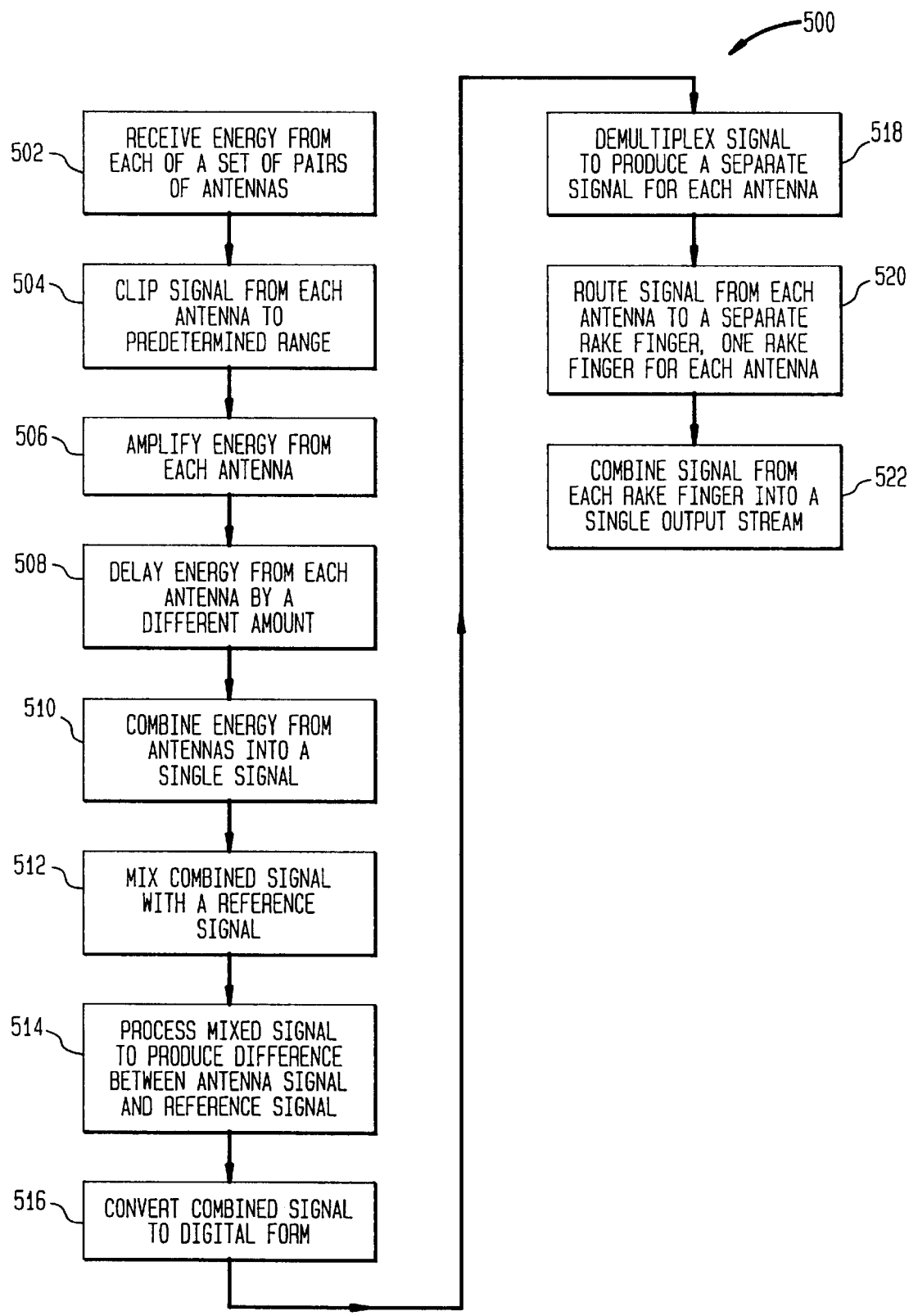
FIG. 5 illustrates a second method for increasing the gain of a second CDMA antenna system in accordance with the present invention.

FIG. 5 illustrates the steps preferably performed by a method 500 according to the present invention for improving the gain of a base station by subjecting the signals from each of a set of antennas, such as the antennas 122–128 of FIG. 3, to a different delay. At step 502, energy is received from each of the antennas. At step 504, the signal from each antenna is restricted to a predetermined range, preferably by passing the signal through a bandpass filter, such as one of the bandpass filters 130–136. At step 506, the energy from each antenna is amplified, preferably by a low noise amplifier, such as one of the low noise amplifiers 130–144.

At step 508, the energy from each antenna is subjected to a different delay, utilizing for example, no delay, one-unit delay 146, two-unit delay 148, or three-unit delay 150. The amount of delay must be greater than the chip time of the rake fingers of the base station's rake receiver. As shown in FIG. 3, it is permissible to subject the signal from one antenna to no delay at all. For example, for a set of four antennas, the first may be subject to a zero delay, the second to a one unit delay of exceeding the rake finger chip time, the second to a two unit delay exceeding twice the rake finger chip time, and the third to three unit delay exceeding three times the rake finger chip time.

At step 510, the energy from the antennas is combined, for example by the four-to-one combiner 152, yielding a single signal. At step 512, the combined signal is mixed, for example, by the mixer 153 with a reference signal from the local oscillator 155. At step 514, each mixed signal is processed to yield a signal representing the difference between the combined antenna signal and the reference signal, preferably by passing the mixed signal through a lowpass filter, such as the lowpass filter 154. At step 516, the combined signal is converted to digital form, for example, by the analog to digital converter 156. At step 518, the signal is demultiplexed to yield multiple signals, by an input selector circuit such as the input selector circuit 158, so that one signal is derived from each antenna. At step 520, the signal from each antenna is routed to a separate rake finger, such as one of the rake fingers 160–166. At step 522, the signals from the rake fingers are combined to yield a single output stream, for example, by the combiner 168.

Figure 6:
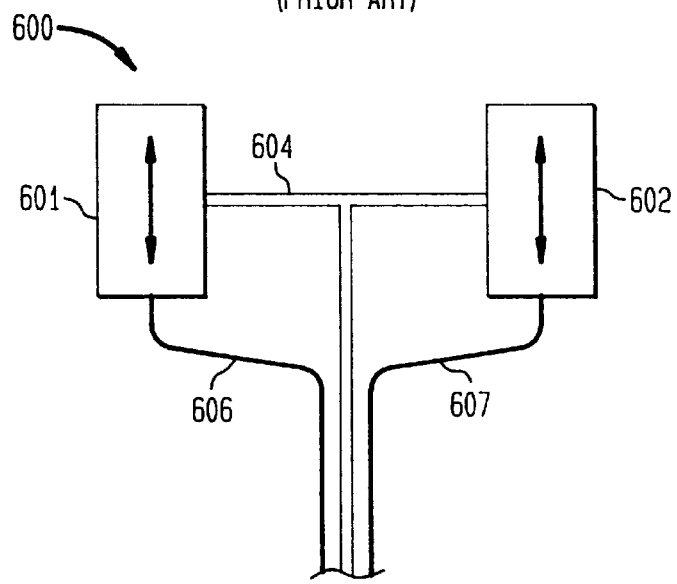
FIG. 6 illustrates an antenna array typically used in conjunction with the prior art CDMA system of FIG. 1.

FIG. 6 illustrates an antenna arrangement which may typically be employed in conjunction with the prior art approach of FIG. 1. FIG. 6 illustrates a two-branch horizontal diversity antenna array 600 which includes two vertically polarized antennas 601 and 602 mounted on a tower structure 604 and connected to a base station (not shown) by RF cables 606 and 607. The antennas 601 and 602 are typically spaced apart horizontally by a distance of 10–20 wavelengths, $\lambda$, which would be about 10–20 feet for cellular communication at a frequency of approximately 900 MHz, or about 5–10 feet for PCS communication at a frequency of approximately 1.96 GHz.

Figure 7:
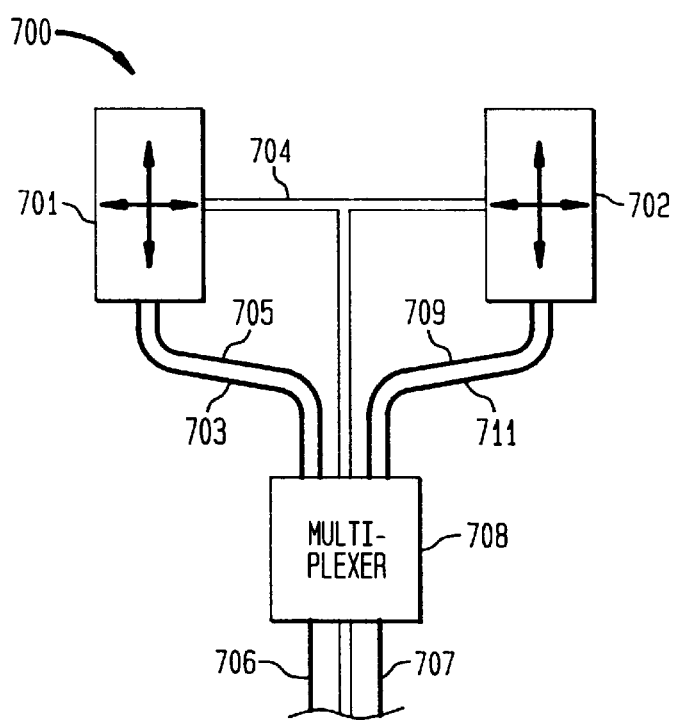
FIGS. 7–10 illustrate a variety of antenna arrays which may suitably be employed in conjunction with the present invention.

FIGS. 7–10 illustrate a number of antenna arrangements which may be suitably employed in conjunction with the present invention. FIG. 7 illustrates a first four-branch polarization/spatial diversity antenna array 700 which includes two pairs of 0°/90° dual polarized antennas 701 and 702 mounted on a tower structure 704. Like the antennas 601 and 602 of the prior art, the antenna pairs 701 and 702 may be horizontally spaced 10–20 $\lambda$ apart in a housing comparable in size to those of the prior art so that the new array is largely transparent in appearance to an observer. RF cables 703 and 705 connect the antennas 701 to a 4:2 temporal multiplexer 708 which may be constructed in the manner shown for temporal multiplexer 65 of FIG. 2. RF cables 709 and 711 connect the antennas 702 to the multiplexer 708. Finally, RF cables 706 and 707 connect the outputs of the multiplexer 708 to a base station (not shown). The pairs of antennas 701 and 702 may suitably be utilized as the pairs of antennas 62 and 64, and 66 and 68 of FIG. 2, or as the pairs of antennas 122 and 124, and 126 and 128 of FIG. 3 if a 4:1 temporal multiplexer like the temporal multiplexer 125 of FIG. 3 is employed.

Figure 8:
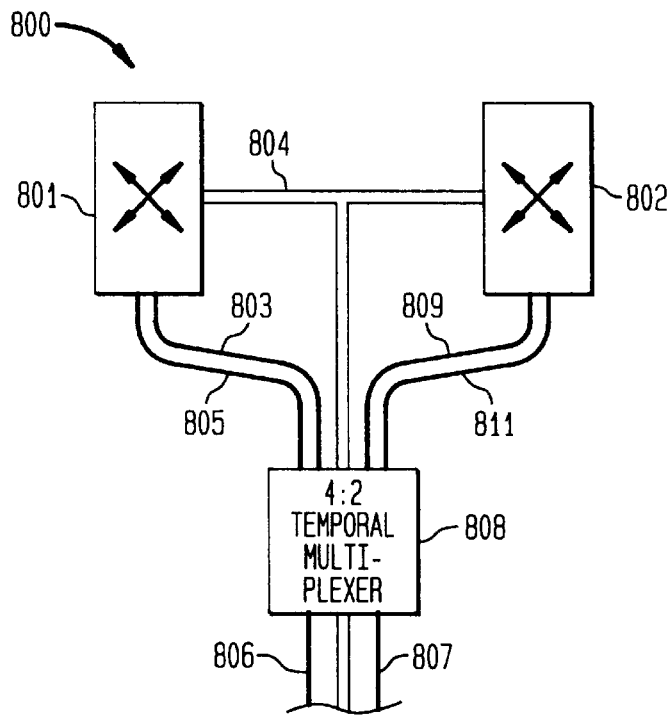

FIG. 8 illustrates a second four-branch polarization/spatial diversity antenna array 800 which includes two pairs of ±45° dual polarized antennas 801 and 802 mounted on a tower structure 804. Again, this mounting arrangement is largely transparent to the system's observer. RF cables 803 and 805 connect the antennas 801 to a 4:2 temporal multiplexer 808. Similarly, RF cables 809 and 811 connect the antennas 802 to the multiplexer 808. RF cables 806 and 807 connect the outputs of the multiplexer 808 to a base station (not shown). The antennas 801 and 802 may suitably be employed as the pair of antennas 62 and 64, and 66 and 68 of FIG. 2, or as the pairs of antennas 122 and 124, and 126 and 128 of FIG. 3 if a 4:1 temporal multiplexer is employed.

Figure 9:
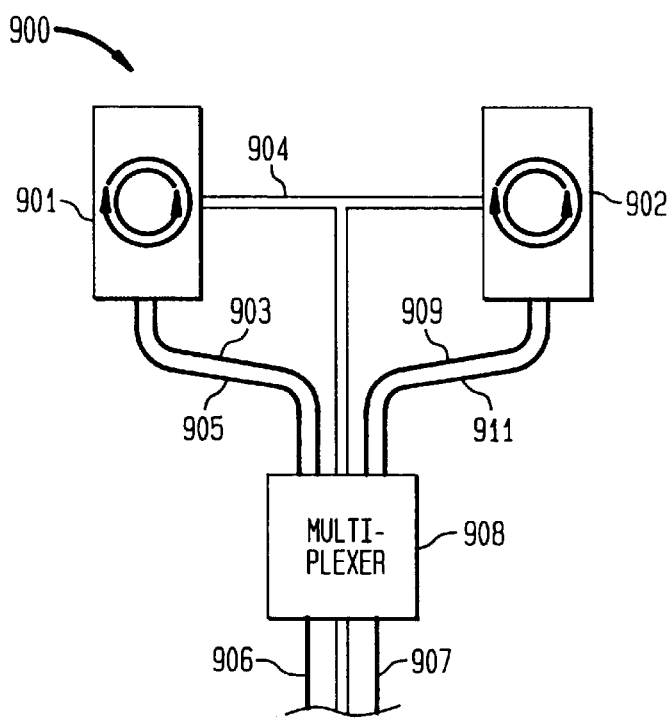

FIG. 9 illustrates a third four-branch polarization/spatial diversity antenna array 900 which includes two pairs of dual circular polarized antennas 901 and 902 mounted on a tower structure 904. Again, the same 10–20 $\lambda$ horizontal spacing is employed. RF cables 903 and 905 connect the antennas 901 to a 4:2 temporal multiplexer 908. Similarly, RF cables 909 and 911 connect the antennas 902 to the multiplexer 908. Cables 906 and 907 connect the output of the multiplexer 908 to a base station (not shown). The pairs of antennas 901 and 902 may suitably be employed as the pairs of antennas 62 and 64, and 66 and 68 of FIG. 2, or as the pairs of antennas 122 and 124, and 126 and 128 if a 4:1 temporal multiplexer is employed.

Figure 10:
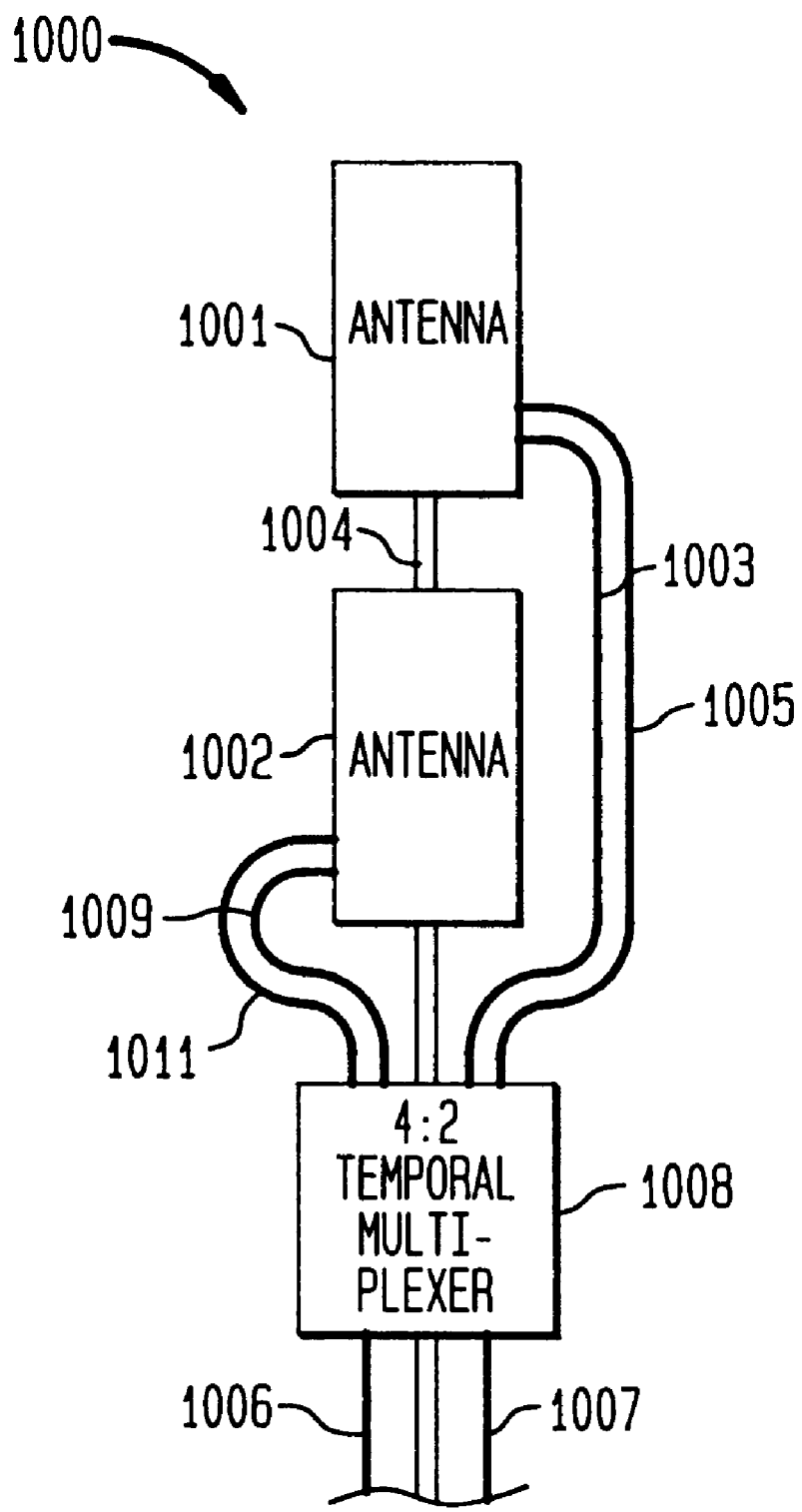

Finally, FIG. 10 illustrates an alternative vertically spatially separated antenna array 1000 which includes two pairs of dual polarized antennas 1001 and 1002 mounted on a tower structure 1004. The antennas 1001 and 1002 may suitably be 0°/90°, ±45°, or circular polarized antennas and are vertically spaced so that their centers are spaced about 10–20 $\lambda$ apart. This arrangement advantageously reduces the horizontal dimension of the antenna array. RF cables 1003 and 105 connect the antennas 1001 to a 4:2 temporal multiplexer 1008. RF cables 1009 and 1011 connect the antennas 1002 to the multiplexer 1008. Cables 1006 and 1007 connect the outputs of multiplexer 1008 to a base station (not shown).

While the present invention is disclosed in the context of a presently preferred embodiment for increasing the gain of an existing CDMA base station, it will be recognized that a wide variety of implementations may be employed by persons of ordinary skill in the art consistent with the above discussion, the normal evolution of the technology, and the claims which follow below. By way of example, it will be recognized that different numbers of antennas and other components may be employed depending upon the application environment. Further, it will be recognized that additional rake fingers, delay elements, and antennas may be employed with a ratio of rake fingers to antennas of one to one being optimum.

What is claimed is:

1. An uplink antenna system for an uplink station of a CDMA base station, said system comprising:

two or more antennas for receiving signals from transmitting mobiles;

a plurality of delay units, each of said delay units connected to one of said two or more antennas, each of said delay units being operative to delay transmission of energy received from said one antenna to which it is connected;

a plurality of rake fingers, each of said rake fingers corresponding to one and only one of said antennas, each of said rake fingers operable to receive a signal representative of energy received by said corresponding antenna; and an input selector, said input selector receiving a plurality of signals, each of said signals being received by said input selector from one of said antennas or from a delay unit connected to one of said antennas, each signal being representative of energy received by a corresponding antenna, said input selector being operative to selectively route said signals from each one of said antennas or from a delay unit connected to one of said antennas to a corresponding one of said rake fingers.

2. The antenna system of claim 1 further comprising a plurality of analog-to-digital converters, each of said analog-to-digital converters being connected directly or through one of said delay units to one of said antennas, each of said analog-to-digital converters being operative to construct as an output a digital data stream representative of said energy received by said connected antenna, each of said analog-to-digital converters being connected to said input selector, said output providing an input to said input selector.

3. The antenna system of claim 2, wherein said one or more antennas consist of a plurality of pairs of antennas, each of said pairs of antennas consisting of a first antenna and a second antenna.

4. The antenna system of claim 3, wherein one of said delay units is connected to each of said second antennas of each of said pairs of antennas.

5. The antenna system of claim 4, wherein each of said delay units delays a signal from each of said second antennas by an amount greater than a chip time of said input selector.

6. The antenna system of claim 5, including a low noise amplifier connected to each antenna, said low noise amplifier being operative to amplify said signal received by said antenna.

7. The antenna system of claim 6, wherein the number of pairs of antennas is two.

8. The antenna system of claim 2, wherein each of said delay units is programmed with a specific delay value, said delay value of each of said delay units differing from said values of said other delay units by an amount greater than a chip time of said input selector.

9. A method for increasing the gain of a CDMA uplink antenna system, comprising the steps of:

receiving energy from transmitting mobiles utilizing two or more uplink antennas, delaying energy from at least one of said antennas;

constructing a plurality of signals, each signal being based on said delayed energy from at least one of said antennas; and selectively routing a signal from each of said antennas to a corresponding one of a plurality of rake fingers, each rake finger corresponding to one and only one of said antennas, each of said antennas corresponding to one and only one of said rake fingers.

10. The method of claim 9, and also including the step of constructing a digital signal for each of said antennas, each of said signals being based on energy received by one and only one of said antennas.

11. The method of claim 10, wherein energy is received from each of a plurality of pairs of antennas, each pair including a first antenna and a second antenna, and further includes delaying said energy from each of said second antennas of each of said pairs.

12. The method of claim 11, wherein said energy from each of said second antennas is delayed by an amount greater than a chip constant of said antenna system.

13. The method of claim 10, including delaying energy from each of said antennas by a different amount, said energy from each of said antennas being delayed by an amount differing from said delay of said energy from each of said other antennas by more than a chip constant of said antenna system.

14. The method of claim 13, including amplifying said energy from each of said antennas before constructing said digital signal based on said energy of said antenna.

* * * * *